US011946573B2

United States Patent
Salunkke et al.

(10) Patent No.: US 11,946,573 B2
(45) Date of Patent: Apr. 2, 2024

(54) VALVE PACKAGE FOR HVAC SYSTEM

(71) Applicant: Johnson Controls Tyco IP Holdings LLP, Milwaukee, WI (US)

(72) Inventors: Abhijeet Rajesh Salunkke, Pune (IN); Rohan Kailas More, Gulbarga (IN); Sushilkumar Dnyandev Gorad, Pune (IN); Timothy John Wilson, St. Petersburg, FL (US); Angus B. Latham, St. Petersburg, FL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 194 days.

(21) Appl. No.: 17/541,118

(22) Filed: Dec. 2, 2021

(65) Prior Publication Data
US 2023/0175617 A1 Jun. 8, 2023

(51) Int. Cl.
*F16L 19/10* (2006.01)
*F24F 1/28* (2011.01)
*F24F 1/30* (2011.01)

(52) U.S. Cl.
CPC .............. *F16L 19/10* (2013.01); *F24F 1/28* (2013.01); *F24F 1/30* (2013.01); *F16L 2201/20* (2013.01); *F16L 2201/40* (2013.01)

(58) Field of Classification Search
CPC ... F16L 19/10; F16L 2201/20; F16L 2201/40; F24F 1/28; F24F 1/30
USPC .......................................................... 62/89
See application file for complete search history.

(56) References Cited

U.S. PATENT DOCUMENTS

| 4,483,555 A | 11/1984 | Ludwig |
| 7,596,962 B2* | 10/2009 | Karamanos ............... F24F 1/26 |
| | | 62/298 |

FOREIGN PATENT DOCUMENTS

| CN | 209115890 U | 7/2019 |
| EP | 1022504 B1 | 7/2000 |
| JP | 4253026 B2 | 4/2009 |
| WO | 1995032078 A1 | 11/1995 |

OTHER PUBLICATIONS

AB-QM 4.0 Flexo, flexible PICV connection set for Fan Coil Units, Danfoss, Oct. 19, 2020, 4 pgs, https://www.danfoss.com/en/about-danfoss/news/dhs/new-ab-qm-4-0-flexo/.

(Continued)

*Primary Examiner* — Steve S Tanenbaum
(74) *Attorney, Agent, or Firm* — Fletcher Yoder P.C.

(57) ABSTRACT

A heating, ventilation, and/or air conditioning (HVAC) system includes a conduit assembly with a first conduit segment, a second conduit segment, and a rotational fitting fluidly coupling the first conduit segment and the second conduit segment to one another. The conduit assembly is configured to fluidly couple to a port of a heat exchanger of the HVAC system, and the rotational fitting is configured to enable the first conduit segment and the second conduit segment to rotate relative to one another between a first orientation and a second orientation and maintain a connection between the first conduit segment and the second conduit segment during relative rotation between the first conduit segment and the second conduit segment.

20 Claims, 10 Drawing Sheets

(56) References Cited

OTHER PUBLICATIONS

Flipkart, "Ks lok Om Tubes, 90 Degree Union Elbow, Stainless Steel 304, Tube Fittings 3/8"NPT (Pack of 10) 2-Way 90° C. Elbow Pipe Joint," Aug. 2, 2021, 2 pages, https://www.flipkart.com/ks-lok-om-tubes-90-degree-union-elbow-stainless-steel-304-tube-fittings-3-8-npt-pack-10-2-way-90-elbow-pipe-joint/p/itmewfnuqdhcwhwj.
Kinnari Steel Corporation, "Union Elbow," Jun. 1, 2014, 2 pages, http://www.kinnaristeel.com/ferrule-fitting/tube-to-union/union-elbow/.

* cited by examiner

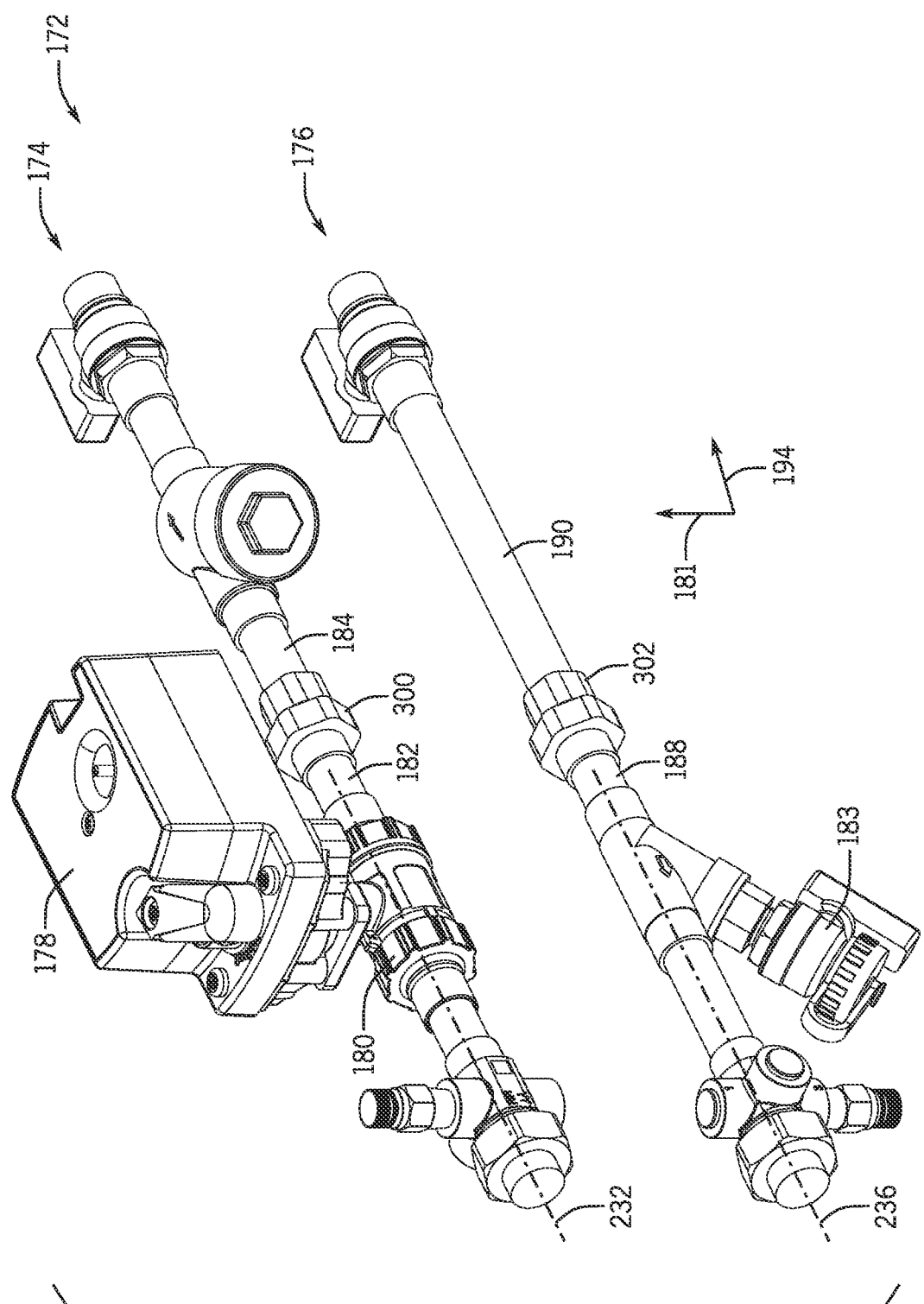

VALVE PACKAGE FOR HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In certain embodiments, the HVAC system may include conduits (e.g., tubing, piping) that may circulate the working fluid through different components of the HVAC system. In some circumstances, it may be desirable to configure or incorporate the conduits in different manners for different HVAC systems. For example, conduits may extend in different directions and/or be coupled to a component in different manners. However, it may be difficult to manufacture, install, or otherwise implement different arrangements of conduits.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a conduit assembly with a first conduit segment, a second conduit segment, and a rotational fitting fluidly coupling the first conduit segment and the second conduit segment to one another. The conduit assembly is configured to fluidly couple to a port of a heat exchanger of the HVAC system, and the rotational fitting is configured to enable the first conduit segment and the second conduit segment to rotate relative to one another between a first orientation and a second orientation and maintain a connection between the first conduit segment and the second conduit segment during relative rotation between the first conduit segment and the second conduit segment.

In one embodiment, a valve package for a terminal unit of a heating, ventilation, and/or air conditioning (HVAC) system includes a first conduit segment configured to couple to a port of a heat exchanger of the terminal unit, a second conduit segment fluidly coupled to the first conduit segment, and a fitting assembly configured to fluidly couple the first conduit segment and the second conduit segment to one another. The fitting assembly includes a rotational fitting configured to enable adjustment of the first conduit segment and the second conduit segment between a first spatial configuration and a second spatial configuration, maintain a securement during adjustment of the first conduit segment and the second conduit segment, and establish a fluid connection between the first conduit segment and the second conduit segment in each of the first spatial configuration and the second spatial configuration.

In one embodiment, a terminal unit of an heating, ventilation, and/or air conditioning (HVAC) system includes a housing, a heat exchanger disposed within the housing and having a coil configured to direct a working fluid therethrough and place the working fluid in a heat exchange relationship with an air flow directed through the housing, and a valve package configured to fluidly couple to the coil of the heat exchanger. The valve package is configured to direct the working fluid therethrough, and the valve package comprises a first conduit segment, a second conduit segment, and an adjustable fitting coupling the first conduit segment and the second conduit segment to one another, and the adjustable fitting is configured to enable the first conduit segment and the second conduit segment to transition between a first spatial configuration and a second spatial configuration and establish a fluid seal between the first conduit segment and the second conduit segment in each of the first spatial configuration and the second spatial configuration.

BRIEF DESCRIPTION OF THE DRAWINGS

Various aspects of this disclosure may be better understood upon reading the following detailed description and upon reference to the drawings in which:

FIG. 10 is a perspective view of an embodiment of a valve package that may be incorporated in an HVAC system, in accordance with an aspect of the present disclosure.

DETAILED DESCRIPTION

Figure 1:
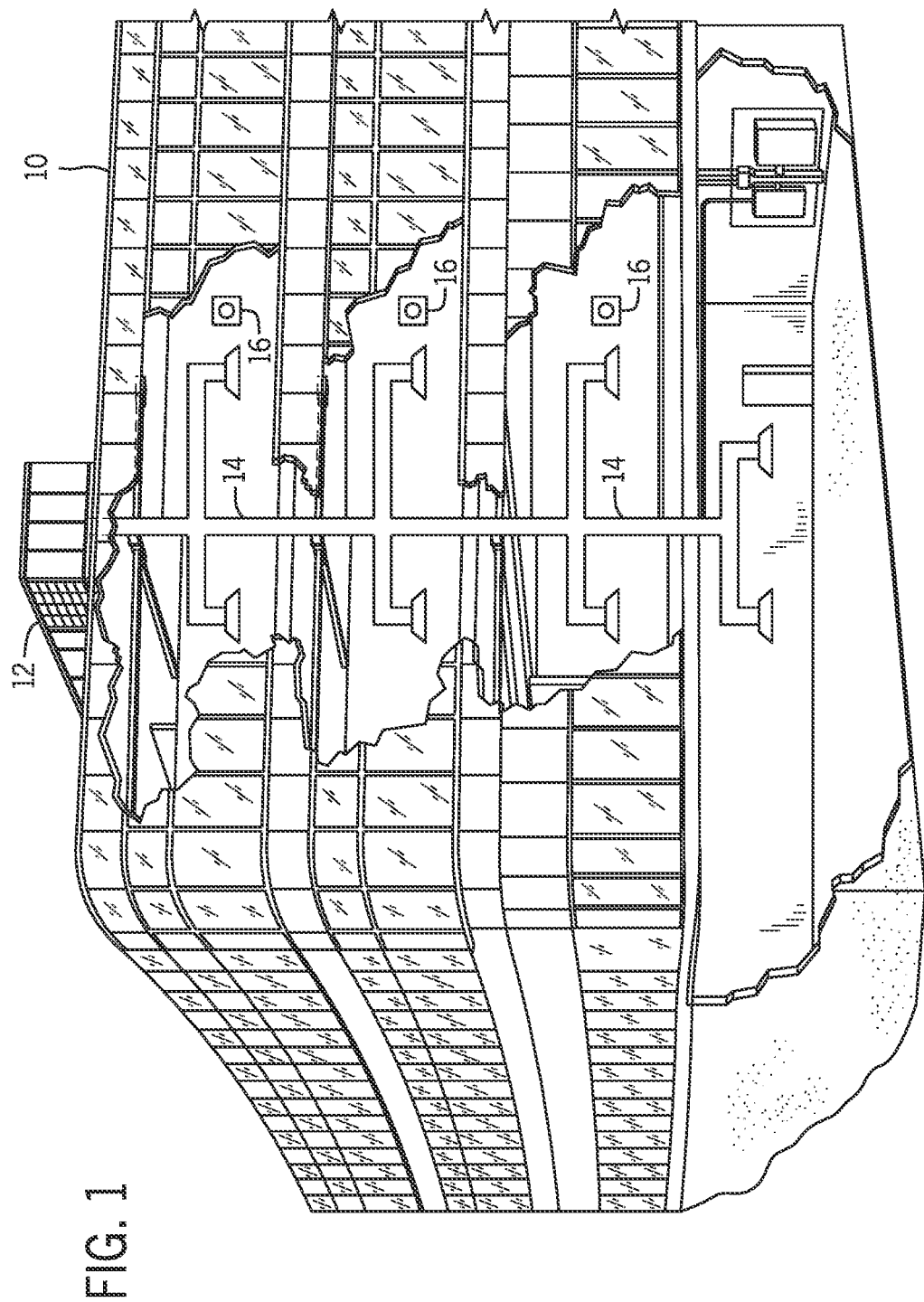
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a system or circuit configured to circulate a working fluid and place the working fluid in a heat exchange relationship with a conditioning fluid, such as an air flow, to change a temperature, humidity, or other characteristic of the conditioning fluid. For example, the HVAC system may include a heat exchanger configured to receive the working fluid and place the working fluid in a heat exchange relationship with the conditioning fluid to change a characteristic of the conditioning fluid. The HVAC system may then deliver the conditioning fluid to condition a room, another fluid (e.g., process fluid), or the like. In some embodiments, the working fluid may heat the conditioning fluid. In additional or alternative embodiments, the working fluid may cool and/or dehumidify the conditioning fluid.

The HVAC system may include conduits, such as piping and/or tubing, configured to direct the working fluid through the HVAC system. For example, the conduits may direct the working fluid into and/or out of the heat exchanger. Different HVAC systems may utilize different configurations or arrangements of conduits, such as different orientations in which conduits are coupled to one another and/or components of the HVAC systems. For instance, in a first configuration, a first conduit may be coupled to a second conduit and to a first port of a heat exchanger, and the second conduit may extend in a first direction relative to the orientation of the HVAC system. In a second configuration, the first conduit may be coupled to the second conduit and to a second port of the heat exchanger, and the second conduit extend in a second direction (e.g., opposite the first direction) relative to the orientation of the HVAC system. As an example, the conduits may be arranged in different manners (e.g., orientations) based on particular location of the HVAC system in an installed configuration.

Unfortunately, it may be difficult to adjust the configurations of the conduits using existing techniques. By way of example, each configuration of the conduits may include a specific or unique set of components, such as particular conduit segments, a particular fitting configured to couple the conduit segments to one another, a particular valve configured to couple to one of the conduit segments, and the like. In other words, a first set of components may be implemented in a first configuration of the conduits, and a second set of components that is different from the first set of components may be implemented in a second configuration of the conduits. Thus, additional components may be manufactured and/or purchased to enable installation of the HVAC system with different configurations of conduits, thereby increasing a cost and/or complexity associated with a manufacture and/or installation of the HVAC system. Additionally or alternatively, adjusting the configuration of conduits may include performance of multiple procedural steps, such as decoupling, re-positioning, and/or re-coupling of components. As such, adjusting the configuration of conduits may be time consuming and/or tedious.

Thus, it is presently recognized that implementing an assembly (e.g., a valve package assembly) having conduits that are easily adjustable between different configurations may reduce a cost, complexity, and/or amount of time associated with manufacture, production, and/or installation of the HVAC system. Accordingly, embodiments of the present disclosure are directed to an assembly of conduits that are adjustably coupled to one another, such as via a rotational fitting. The rotational fitting may enable conduits to rotate relative to one another, such as to enable a first conduit to rotate about an axis of rotation extending along a length of a second conduit. The rotational fitting may also maintain a fluid seal between the conduits while enabling the conduits to rotate relative to one another. That is, the rotational fitting may block fluid flow out via a coupling between conduits and the rotational fitting while enabling relative rotation between the conduits. Thus, the rotational fitting may maintain fluid flow within the conduits. The rotational fitting may facilitate manufacture, installation, and/or production of the HVAC system. As an example, the rotational fitting may enable adjustment of the assembly of conduits between different configurations, such as different orientations relative to one another. Thus, a single embodiment of the assembly of conduits may be manufactured, adjusted, and incorporated into different embodiments of HVAC systems, such as different embodiments of terminal units. Indeed, the same set of components may be installed with each different embodiment of HVAC system, and the rotational fitting may enable the components to be oriented in different manners to accommodate a desired installation configuration for a particular HVAC system. Thus, the disclosed assembly (e.g., valve package assembly) may reduce a number of different components and/or assemblies to be produced to accommodate different HVAC system (e.g., terminal unit) installations, which may improve manufacture and installation of HVAC systems.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
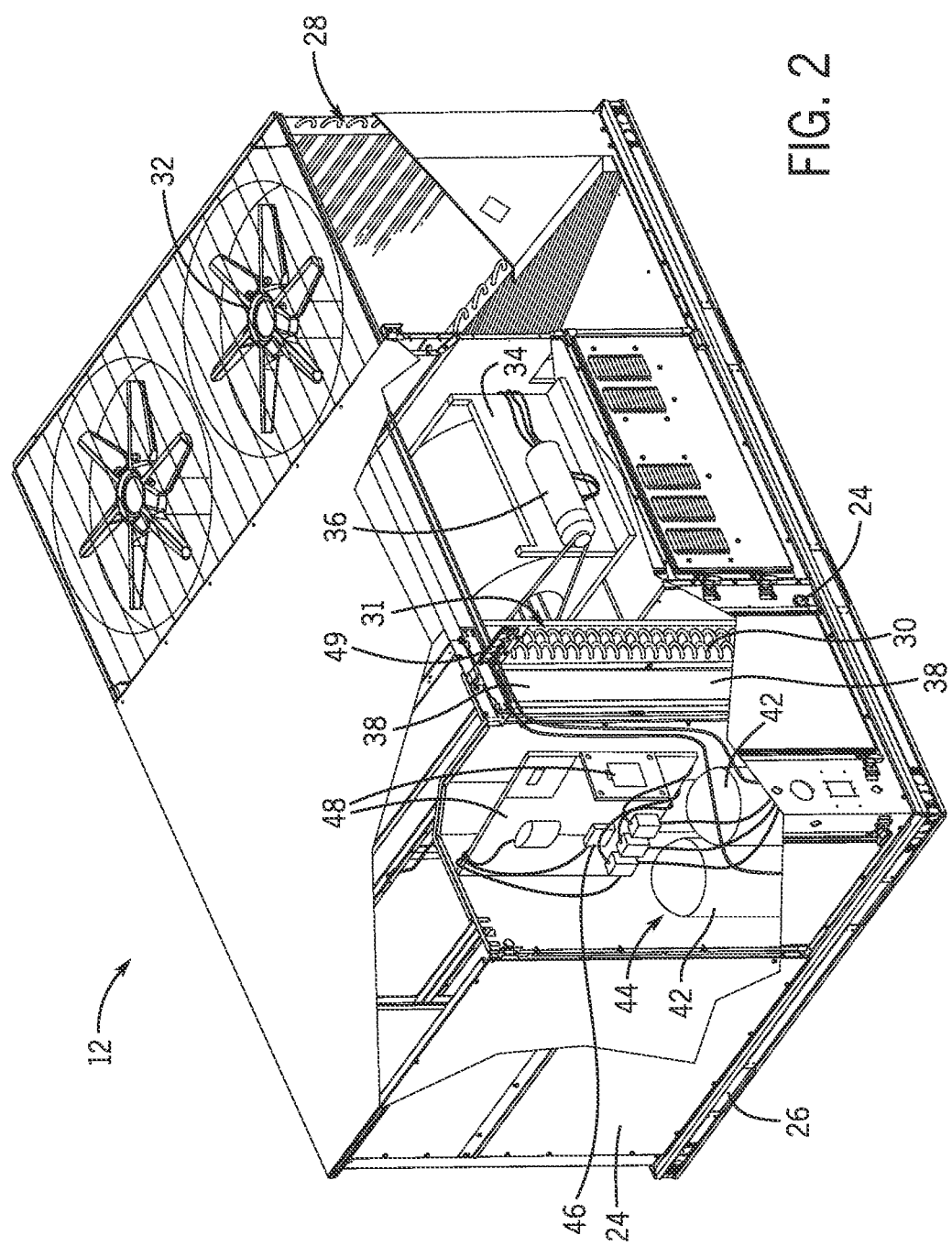
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
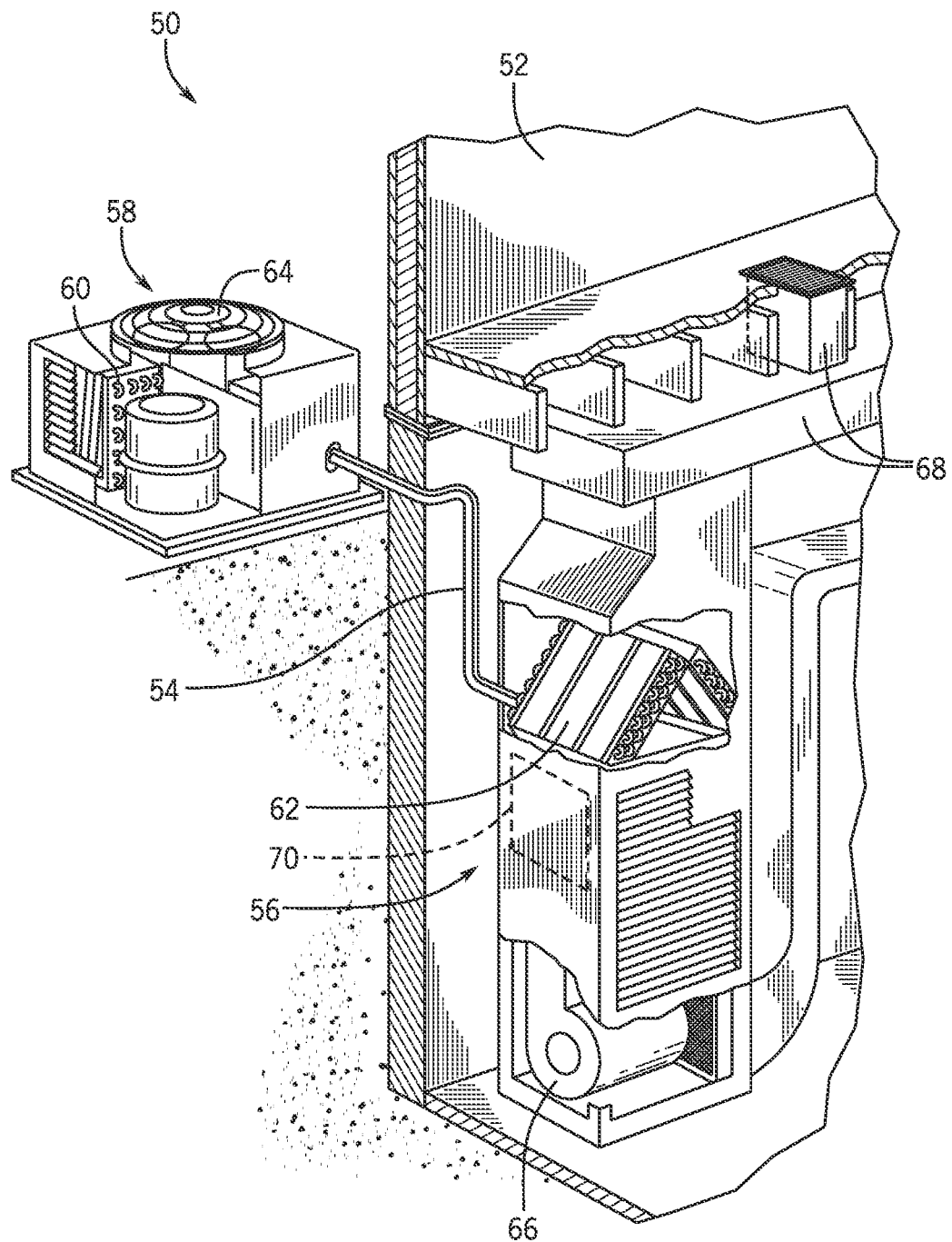
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
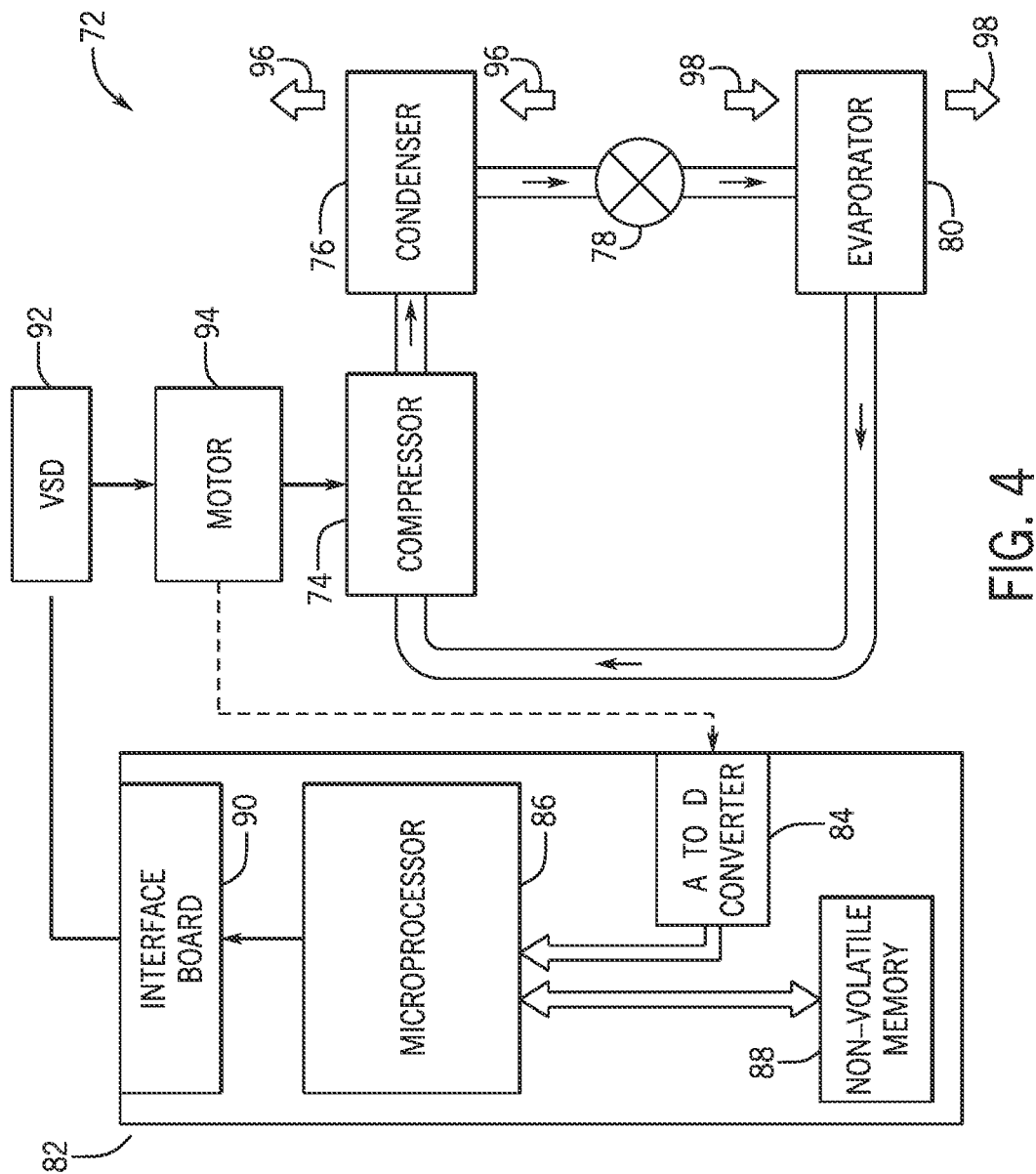
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system having a valve assembly (e.g., a valve package, conduit assembly) having conduits that are adjustable between multiple configurations. For example, the assembly disclosed herein may be positioned or arranged in multiple, different configurations based on a particular installation and/or embodiment of the HVAC system with which the assembly is incorporated. In some embodiments, conduits of the valve assembly are fluidly coupled to one another via a rotational fitting. The rotational fitting may enable the conduits to rotate relative to one another while establishing a fluid seal between the conduits. For example, the rotational fitting may enable relative rotation between the conduits to adjust the assembly between different configurations. Thus, the rotational fitting may improve ease of adjustment of the conduits between different orientations, such as without decoupling and/or recoupling the conduits and/or without using additional components. Indeed, the rotational fitting may enable a single embodiment of the valve assembly to be manufactured for different embodiments of HVAC system. For example, the single embodiment of the valve assembly may be manufactured for incorporation in a variety of HVAC systems configured to be installed in different applications and/or locations, and the valve assembly may be adjustable within each HVAC system to enable installation of the HVAC system in a particular application and/or location.

Figure 5:
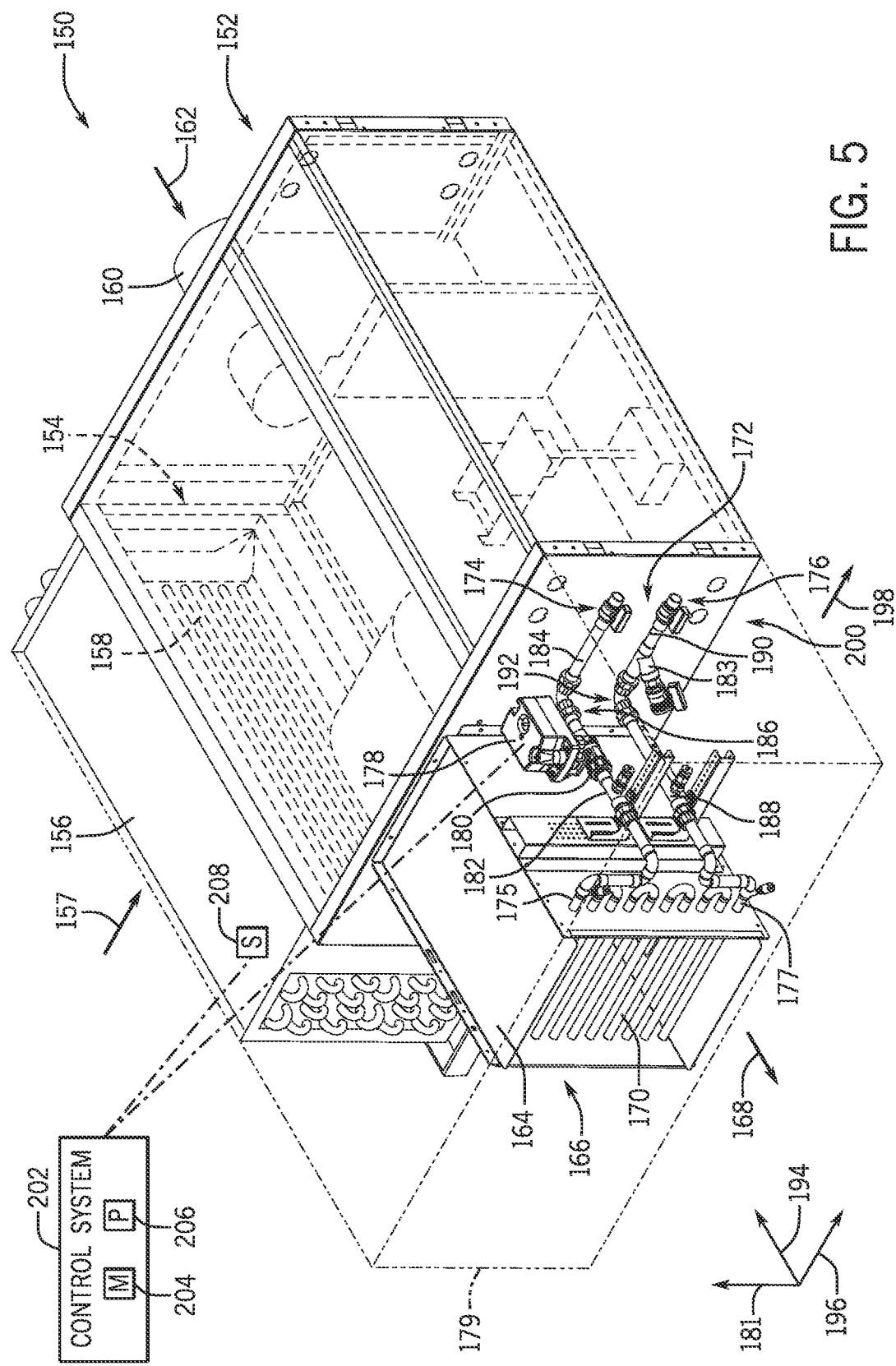
FIG. 5 is a perspective view of an embodiment of an HVAC system including a valve package, in accordance with an aspect of the present disclosure.

With this in mind, FIG. 5 is a perspective view of an embodiment of an HVAC system 150 configured to condition a conditioning fluid, such as an air flow. In the illustrated embodiment, the HVAC system 150 is a terminal unit, but in other embodiments the HVAC system 150 may be a packaged HVAC unit, an air handler, or any other suitable HVAC system. The HVAC system 150 may include a housing 152 through which the air flow is directed for conditioning. For example, air may be directed (e.g., from a conditioned environment, from an ambient environment, from another HVAC system, from ductwork) into the housing 152 via an inlet 154 (e.g., a first inlet, an inlet duct) of the housing 152 and across a first heat exchanger 156 (e.g., in a first inlet direction 157). The first heat exchanger 156 may be configured to condition (e.g., cool) the air flowing across the first heat exchanger 156. For example, the first heat exchanger 156 may include heat exchange coils 158 (e.g., first heat exchange coils, cooling coils, heating cools), the HVAC system 150 may circulate a working fluid (e.g., water) through the heat exchange coils 158, and the air flow may be directed across the heat exchange coils 158. In some embodiments, a chilled working fluid may be directed through the heat exchange coils 158, and the chilled working fluid may absorb heat from the air flowing across the heat exchange coils 158, thereby cooling the air flow. Additionally or alternatively, an air flow may be directed into the housing 152 via an inlet duct 160 (e.g., a second inlet) in a second inlet direction 162. For example, the inlet duct 160 may be fluidly coupled to ductwork and may receive the air flow (e.g., from a conditioned environment, from an ambient environment, from another air handler or HVAC system) from the ductwork. In some embodiments, the inlet duct 160 may receive an air flow from an environment surrounding the HVAC system 150. For example, the HVAC system 150 may be a terminal unit positioned in or near a conditioned space (e.g., a dropped ceiling), and the inlet duct 160 may receive an air flow from the conditioned space and direct the air flow into the housing 152. In certain embodiments, the air flowing through the inlet duct 160 and into the housing 152 may not flow across the first heat exchanger 156 or another heat exchanger configured to condition (e.g., heat, cool, dehumidify) the air flow. Thus, the air flowing into the housing 152 via the inlet duct 160 may not be further conditioned by the HVAC system 150.

The HVAC system 150 may discharge the air flow from the housing 152 via an outlet duct 164 (e.g., an enclosure, a conduit) of or disposed within the housing 152. The outlet duct 164 may include a second heat exchanger 166 across which the air is directed (e.g., in an outlet flow direction 168) as the air is discharged from the housing 152. In some embodiments, the second heat exchanger 166 may be configured to heat or cool the air flowing across the second heat exchanger 166. In the illustrated embodiment, the outlet duct 164 defines a passage through which the air is discharged from the housing 152, and the second heat exchanger 166 includes heat exchange coils 170 (e.g., second heat exchanger coils, cooling coils, heating coils) extending across the passage of the outlet duct 164. In some embodiments, a heated working fluid (e.g., water) may be directed through the heat exchange coils 170 during operation of the second heat exchanger 166. The air flowing across the heat exchange coils 170 may absorb heat from the heated working fluid directed through the heat exchange coils 170, thereby heating the air flow.

In certain embodiments, the HVAC system 150 may operate to cool the air flow via the first heat exchanger 156 to condense moisture contained in the air flow, thereby dehumidifying the air flow, and to heat the dehumidified air flow via the second heat exchanger 166 to increase the temperature of the dehumidified air flow to a target, desirable, or comfortable temperature. As an example, the HVAC system 150 may receive the air flow via the first heat exchanger 156 and not via the inlet duct 160. Thus, substantially all of the air flowing across the second heat exchanger 166 may first flow across the first heat exchanger 156. As another example, the HVAC system 150 may receive a first air flow via the first heat exchanger 156 and a second air flow via the inlet duct 160, and the first and second air flows may mix within the housing 152. As such, the second heat exchanger 166 may receive a mixture or combination of the first and second air flows. In additional or alternative embodiments, the HVAC system 150 may operate to heat the air flow via the second heat exchanger 166 without cooling the air flow (e.g., chilled working fluid may not be circulated through the first heat exchanger 156 and/or air flow may not be directed into the HVAC system 150 through the first heat exchanger 156). In further embodiments, the HVAC system 150 may operate to cool the air flow, such as via the second heat exchanger 166, without heating the air flow. For instance, heated working fluid may not be circulated through the heat exchange coils 170, and the HVAC system 150 may discharge the air flow through the outlet duct 164 without heating the air flow via the heat exchange coils 170.

While the second heat exchanger 166 may be configured to circulate a working fluid to condition the air flow, in additional or alternative embodiments, the second heat exchanger 166 may condition the air flow using other techniques, such as an electric heater and/or a gas heater. Further, in some embodiments, the HVAC system 150 may not include the first heat exchanger 156. For example, the HVAC system 150 may be configured to receive a first air flow (e.g., from a conditioned environment) via the inlet 154 and a second air flow (e.g., a conditioned air flow from another HVAC system or air handler) via the inlet duct 160, and the second heat exchanger 166 may be configured to heat and/or cool the first air flow and/or second air flow upon discharge from the HVAC system 150.

The illustrated HVAC system 150 includes a valve package or assembly 172 (e.g., a conduit system, a valve system) fluidly coupled to the heat exchange coils 170. The valve package 172 may be configured to control flow (e.g., a flow rate) of working fluid directed through the heat exchange coils 170. For example, the valve package 172 may include a first conduit assembly 174, which may be fluidly coupled to an outlet port 175 of the heat exchange coils 170. The valve package 172 may also include a second conduit assembly 176, which may be fluidly coupled to an inlet port 177 of the heat exchange coils 170. Thus, the first conduit assembly 174 may direct working fluid out of the heat exchange coils 170, and the second conduit assembly 176 may direct the working fluid into the heat exchange coils 170.

In some embodiments, the first conduit assembly 174 and the second conduit assembly 176 may be positioned at least partially external to the housing 152. For instance, the conduit assemblies 174, 176 may circulate the working fluid between the heat exchange coils 170 and a working fluid source positioned external to the housing 152. However, the valve package 172 may be positioned within an overall outer boundary or footprint 179 defined by the housing 152 (e.g., lateral edges). As such, the valve package 172 may not increase a size of the overall outer boundary 179 of the housing 152. Furthermore, there may be a limited interference, exposure, or contact between the valve package 172 and an external environment or external elements (e.g., debris, a shipping container) surrounding the housing 152. Such arrangement may facilitate ease of installation of the HVAC system 150. By way of example, the valve package 172 may be installed (e.g., at a manufacturer) prior to shipment (e.g., to an installation site) to enable the HVAC system 150 to be shipped with the valve 172 already installed instead of, for example, shipping the HVAC system 150 and the valve package 172 separately and installing the valve package 172 after the HVAC system 150 has been shipped, such as at the installation site.

In some embodiments, the valve package 172 may include an actuator 178, which may control an opening of a valve 180 disposed along the first conduit assembly 174 to adjust a flow of the working fluid through the first conduit assembly 174 and out of the heat exchange coils 170. For example, the actuator 178 may be coupled to or a part of the first conduit assembly 174 and may be configured to adjust the valve 180 between an open position that enables fluid flow through the second heat exchanger 166 via the first conduit assembly 174, a closed position that blocks fluid flow through the second heat exchanger 166 via the first conduit assembly 174, and/or an intermediate position that enables partial fluid flow through the second heat exchanger 166 via the first conduit assembly 174. In certain embodiments, the actuator 178 may be used to control an amount of conditioning (e.g., heating, cooling) provided by the heat exchange coils 170 to the air flowing through the second heat exchanger 166 by controlling the flow rate of the working fluid through the second heat exchanger 166. In the illustrated embodiment, the actuator 178 is positioned above the second conduit assembly 176 along a vertical axis 181 of the HVAC system 150 in an installed configuration of the valve package 172 (e.g., of the first conduit assembly 174 and the second conduit assembly 176). Positioning the actuator 178 above the second conduit assembly 176 in the installed configuration may facilitate operation of the actuator 178. For example, in some circumstances, condensate may form on the second conduit assembly 176 during operation of the HVAC system 150, and a gravitational force may direct the condensate off the second conduit assembly 176 and away from the first conduit assembly 174 and the actuator 178. Thus, contact between the condensate and the actuator 178 is avoided. In additional or alternative embodiments, the actuator 178 may control an opening of a valve of the second conduit assembly 176 to control a flow rate of the working fluid through the second conduit assembly 176 and into the heat exchange coils 170.

The valve package 172 may also include a strainer 183, which may capture certain particles, such as solid particles, contained within the working fluid. The valve package 172 may, for example, be coupled to or a part of the second conduit assembly 176 and may therefore remove particles from the working fluid flowing through the second conduit assembly 176. In such embodiments, the actuator 178 may be positioned above the strainer 183 along the vertical axis 181 in the installed configuration of the valve package 172. In additional or alternative embodiments, the strainer 183 may remove particles from the working fluid flowing through the first conduit assembly 174 and may therefore be coupled to or a part of the first conduit assembly 174.

The first conduit assembly 174 may include a first conduit segment 182 fluidly coupled to a second conduit segment 184 via a first fitting assembly 186, and the second conduit assembly 176 may include a third conduit segment 188 fluidly coupled to a fourth conduit segment 190 via a second fitting assembly 192. In the illustrated embodiment, each of the first conduit segment 182 and the third conduit segment 188 extends along a first horizontal axis 194 (e.g., a longitudinal axis) of the HVAC system 150. Additionally, each of the second conduit segment 184 and the fourth conduit segment 190 extends along a second horizontal axis 196 (e.g., a lateral axis) of the HVAC system 150. For example, the second conduit segment 184 and the fourth conduit segment 190 may extend from the first fitting assembly 186 and the second fitting assembly 192, respectively, along a first direction 198 away from the outlet duct 164 (e.g., toward a working fluid source).

The first fitting assembly 186 may enable relative rotation between the first conduit segment 182 and the second conduit segment 184 while maintaining a connection or securement between the first conduit segment 182 and the second conduit segment 184 during the relative rotation and establishing a fluid seal between the first conduit segment 182 and the second conduit segment 184 in different orientations or spatial configurations between the first conduit segment 182 and the second conduit segment 184. Similarly, the second fitting assembly 192 may enable relative rotation between the third conduit segment 188 and the fourth conduit segment 190 while maintaining a connection or securement between the third conduit segment 188 and the fourth conduit segment 190 during the relative rotation and establishing a fluid seal between the third conduit segment 188 and the fourth conduit segment 190 in different orientations or spatial configurations between the third conduit segment 188 and the fourth conduit segment 190. That is, the first fitting assembly 186 may enable the first conduit segment 182 and the second conduit segment 184 to rotate relative to one another while blocking escape of the working fluid from the first conduit assembly 174 (e.g., via connections between the first conduit segment 182, the second conduit segment 184, and the first fitting assembly 186). The second fitting assembly 192 may enable the third conduit segment 188 and the fourth conduit segment 190 to rotate relative to one another while blocking escape of the working fluid from the second conduit assembly 176 (e.g., via connections between the third conduit segment 188, the fourth conduit segment 190, and the second fitting assembly 192). Thus, the fitting assemblies 186, 192 may enable adjustment of the positioning of the conduit segments 182, 184, 188, 190 (e.g., relative to one another) and concurrently maintain a securement, coupling, and/or engagement (e.g., to establish a fluid seal) between corresponding conduit segments 182, 184, 188, 190.

For example, the first fitting assembly 186 may enable the second conduit segment 184 to rotate and extend along a direction crosswise to the first direction 198 and/or opposite the first direction 198. The second fitting assembly 192 may also enable the fourth conduit segment 190 to rotate and extend along a direction crosswise to the first direction 198 and/or opposite the first direction 198. By way of example, as described herein, the valve package 172 may be arranged in a different configuration for a different HVAC system 150 and/or a different implementation or installation of the HVAC system 150. For instance, the valve package 172 may be in a first configuration 200 (e.g., a first installed configuration, a left hand configuration, a first spatial configuration, a first spatial arrangement) in the illustrated HVAC system 150, whereby the second conduit segment 184 and/or the fourth conduit segment 190 may extend along the first direction 198 in the first configuration 200. The valve package 172 may be in a second configuration, different from the first configuration 200, in a different implementation or installation of the HVAC system 150, and the second conduit segment 184 and/or the fourth conduit segment 190 may not extend along the first direction 198 in the second configuration. The fitting assemblies 186, 192 may enable the valve package 172 to transition between the first configuration 200 and the second configuration by enabling relative rotation between the first conduit segment 182 and the second conduit segment 184 and between the third conduit segment 188 and the fourth conduit segment 190, respectively. Additionally, in each of the configurations of the valve package 172, the valve package 172 may be compact and confined within the overall outer boundary 179. As such, the HVAC system 150 may be shipped with the valve package 172 in any configuration of the valve package 172.

In certain embodiments, the HVAC system 150 may include or be communicatively coupled to a control system 202 (e.g., the control panel 82), such as an automation controller or a programmable controller. The control system 202 may be configured to operate the HVAC system 150, such as to control conditioning provided to air flowing through the HVAC system 150. To this end, the control system 202 may include a memory 204 and processing circuitry 206. The memory 204 may include a non-transitory computer-readable medium that may store instructions that, when executed by the processing circuitry 206, may cause the processing circuitry 206 to perform various operations. To this end, the processing circuitry 206 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like.

As an example, the control system 202 may be communicatively coupled to the actuator 178 and may operate the valve 180 to control a flow rate of the working fluid through the first conduit assembly 174 (e.g., through the first conduit segment 182). For instance, the HVAC system 150 may include a sensor 208 configured to monitor an operating parameter associated with the HVAC system 150. The sensor 208 may transmit sensor data indicative of the operating parameter to the control system 202, and the control system 202 may control operation of the valve 180 based on the sensor data. The operating parameter may include, for example, a temperature and/or flow rate of the working fluid, a temperature and/or humidity of a space serviced by the HVAC system 150, an opening size of the valve 180, a flow rate or temperature of air flow across the heat exchange coils 170, another suitable operating parameter, or any combination thereof. In some embodiments, the control system 202 may operate the valve 180 to adjust a value of the operating parameter monitored by the sensor 208 toward a target value. By way of example, the control system 202 may operate the valve 180 to provide a desirable amount of conditioning (e.g., heating) to the air flow directed across the heat exchange coils 170, such as to heat or cool the air flow to a target temperature. As such, the control system 202 may automatically control the actuator 178. In additional or alternative embodiments, the actuator 178 may be manually controlled by a user (e.g., a technician, an operator, a customer) associated with the HVAC system 150. For instance, the user may manually adjust the actuator 178 and/or provide a user input via the control system 202 to adjust the opening of the valve 180.

Figure 6:
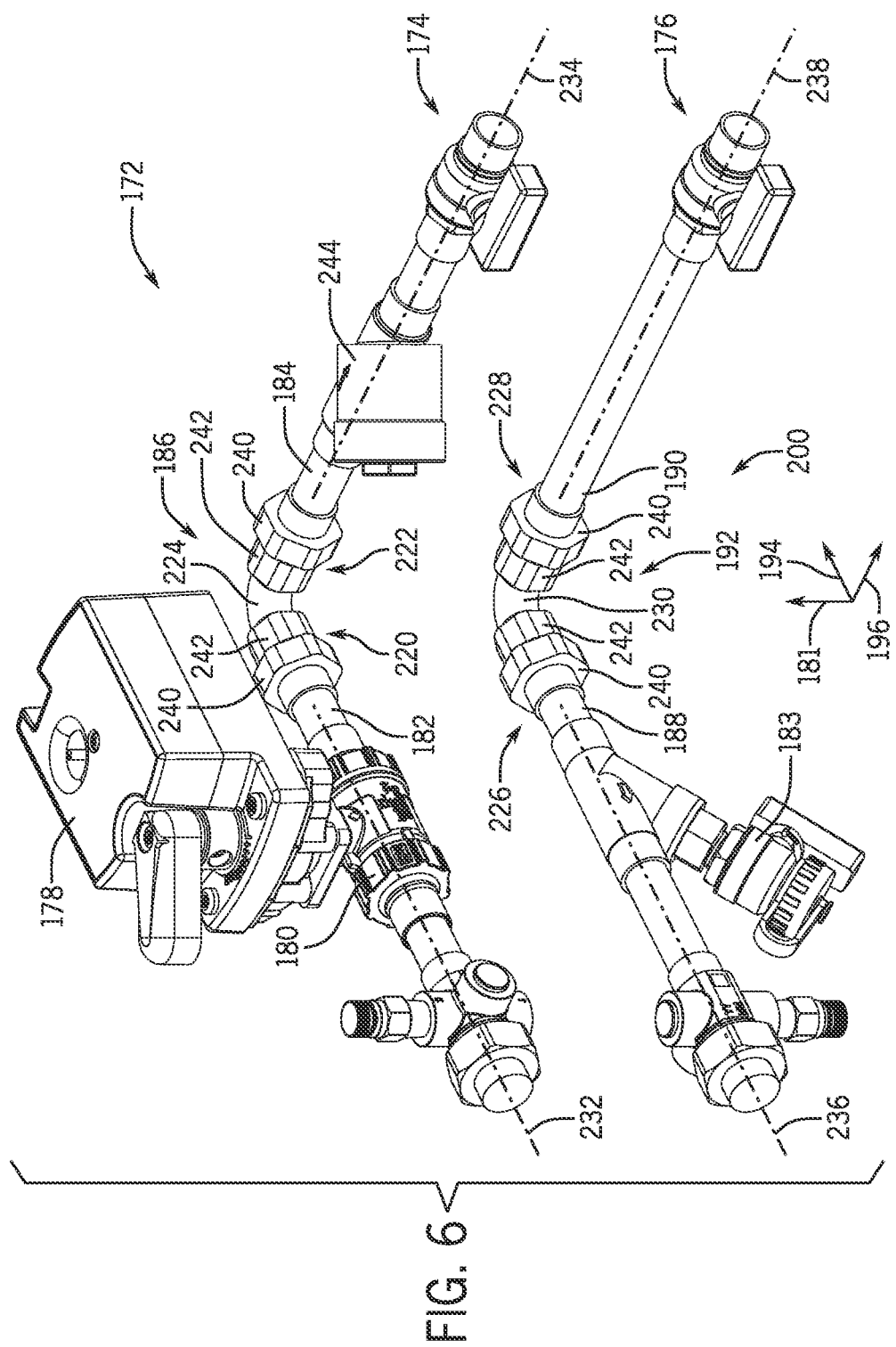
FIG. 6 is a perspective view of an embodiment of a valve package that may be incorporated in an HVAC system, in accordance with an aspect of the present disclosure.

FIG. 6 is a perspective view of an embodiment of the valve package 172 in the first configuration 200. Each of the fitting assemblies 186, 192 may include at least one rotational fitting (e.g., a rotary union, a rotary joint). In the illustrated embodiment, the first fitting assembly 186 includes a first rotational fitting 220, a second rotational fitting 222, and a first intermediate conduit segment 224 extending between the first rotational fitting 220 and the second rotational fitting 222. The second fitting assembly 192 may include a third rotational fitting 226, a fourth rotational fitting 228, and a second intermediate conduit segment 230 extending between the third rotational fitting 226 and the fourth rotational fitting 228. The first rotational fitting 220 may fluidly couple the first conduit segment 182 and the first intermediate conduit segment 224 to one another, and the second rotational fitting 222 may fluidly couple the second conduit segment 184 and the first intermediate conduit segment 224 to one another. Thus, fluid (e.g., the working fluid) may flow through the first conduit assembly 174 via the first conduit segment 182, the first rotational fitting 220, the first intermediate conduit segment 224, the second rotational fitting 222, and the second conduit segment 184. The third rotational fitting 226 may fluidly couple the third conduit segment 188 and the second intermediate conduit segment 230 to one another, and the fourth rotational fitting 228 may fluidly couple the fourth conduit segment 190 and the second intermediate conduit segment 230 to one another. As such, fluid may flow through the second conduit assembly 176 via the fourth conduit segment 190, the fourth rotational fitting 228, the second intermediate conduit segment 230, the third rotational fitting 226, and the third conduit segment 188.

Each of the illustrated intermediate conduit segments 224, 230 includes a bent or a curved geometry (e.g., a 90 degree bend). Thus, the first intermediate conduit segment 224 may orient the first conduit segment 182 crosswise (e.g., perpendicularly) relative to the second conduit segment 184, and the second intermediate segment 230 may orient the third conduit segment 188 crosswise (e.g., perpendicularly) relative to the fourth conduit segment 190. In additional or alternative embodiments, the intermediate conduit segments 224, 230 may have a different geometry to orient the conduit segments 182, 184, 188, 190 in a different manner, such as in an aligned or a parallel orientation, an oblique orientation, or other suitable arrangement.

In an assembled configuration of the valve package 172, the first rotational fitting 220 may enable rotation of the first intermediate conduit segment 224 and therefore the second conduit segment 184 about a first axis 232 extending along a length of the first conduit segment 182, while maintaining a connection or securement between the first conduit segment 182 and the first intermediate conduit segment 224 and establishing a fluid seal between the first conduit segment 182 and the first intermediate conduit segment 224 in different orientations or spatial configurations between the first conduit segment 182 and the first intermediate conduit segment 224. The second rotational fitting 222 may enable rotation of the first intermediate conduit segment 224 and therefore the first conduit segment 182 about a second axis 234 extending along a length of the second conduit segment 184 while maintaining a connection or securement between the second conduit segment 184 and the first intermediate conduit segment 224 and establishing a fluid seal between the second conduit segment 184 and the first intermediate conduit segment 224 in different orientations or spatial configurations between the second conduit segment 184 and the first intermediate conduit segment 224. That is, the first rotational fitting 220 and the second rotational fitting 222 may enable adjustment of the orientation between the first conduit segment 182 and the second conduit segment 184 without fluidly or physically decoupling the first fitting assembly 186 from the first conduit segment 182 and/or the second conduit segment 184.

The third rotational fitting 226 may enable rotation of the second intermediate conduit segment 230 and therefore the fourth conduit segment 190 about a third axis 236 extending along a length of the third conduit segment 188 while maintaining a connection or securement between the third conduit segment 188 and the second intermediate conduit segment 230 and establishing a fluid seal between the third conduit segment 188 and the second intermediate conduit segment 230 in different orientations or spatial configurations between the third conduit segment 188 and the second intermediate conduit segment 230. The fourth rotational fitting 228 may enable rotation of the second intermediate conduit segment 230 and therefore the third conduit segment 188 about a fourth axis 238 extending along a length of the fourth conduit segment 190 while maintaining a connection or securement between the fourth conduit segment 190 and the second intermediate conduit segment 230 and establishing a fluid seal between the fourth conduit segment 190 and the second intermediate conduit segment 230 in different orientations or spatial configurations between the fourth conduit segment 190 and the second intermediate conduit segment 230. Thus, the third rotational fitting 226 and the fourth rotational fitting 228 may enable adjustment of the orientation between the third conduit segment 188 and the fourth conduit segment 190 without fluidly or physically decoupling the second fitting assembly 192 from the third conduit segment 188 and/or the fourth conduit segment 190. As such, the fitting assemblies 186, 192 may facilitate ease of adjustment of the configuration of the valve package 172.

As described above, the configuration of the valve package 172 may be different for different HVAC systems 150, such as different implementations, installations, and/or applications of embodiments of the HVAC system 150. For example, the valve package 172 may be positioned in a different manner (e.g., coupled to the heat exchange coils 170 at different locations relative to the heat exchange coils 170 and/or the housing 152). The fitting assemblies 186, 192 may enable the configuration of the valve package 172 to be adjusted without decoupling various components (e.g., the conduit segments 182, 184, 188, 190) of the valve package 172 from one another and/or without incorporating a different or an additional set of components (e.g., a different conduit segment, a different fitting) into the valve package 172. For example, the same embodiment of components may be used in each valve package 172. Thus, a single embodiment of the valve package 172 may be manufactured, assembled, and implemented in different HVAC systems 150.

In some embodiments, each of the fitting assemblies 186, 192 may include an unlocked (e.g., disengaged, released) configuration and a locked (e.g., engaged, secured) configuration. The unlocked configuration may enable rotation between the corresponding components coupled to (e.g., attached to, threaded to, fastened to, secured to) the fitting assembly 186, 192, and the locked configuration may block rotation between the corresponding components coupled to the fitting assembly 186, 192, thereby maintaining a position or orientation of the components relative to one another. The fitting assemblies 186, 192 may be selectively (e.g., manually) adjusted between the unlocked and the locked configurations.

By way of example, each of the rotational fittings 220, 222, 226, 228 may include a respective first mount 240 (e.g., configured to couple or attach to one of the conduit segments 182, 184, 188, 190) and a respective second mount 242 (e.g., configured to couple or attach to one of the intermediate conduit segments 224, 230). In the unlocked configuration, the corresponding first mount 240 and second mount 242 of one of the rotational fittings 220, 222, 226, 228 may be configured to rotate relative to one another to enable rotation of the corresponding conduit segments 182, 184, 188, 190 relative to the intermediate conduit segments 224, 230 and to one another. Indeed, the rotational fittings 220, 222, 226, 228 may utilize any suitable features, such as a shaft, a bearing, threads, interference fittings (e.g., a press fit), and the like, to enable rotational movement. In the locked configuration, the rotation between the corresponding first mount 240 and second mount 242 may be blocked to block rotation of the corresponding conduit segments 182, 184, 188, 190 relative to the one another and to the corresponding intermediate conduit segments 224, 230. Additionally, in the locked configuration, the rotational fittings 220, 222, 226, 228 may fluidly seal the interface between corresponding conduit segments 182, 184, 188, 190 and intermediate conduit segments 224, 230.

The rotational fittings 220, 222, 226, 228 may also include a feature (e.g., a securement) to enable the fitting assemblies 186, 192 to transition between the unlocked configuration and the locked configuration, such as a screw, a rod, a clamp, a latch, and/or any other suitable feature. The feature may be manually actuated to enable or block transition between the locked and unlocked configurations and thereby enable or block relative rotation between the mounts 240, 242. In certain embodiments, the fitting assemblies 186, 192 may be adjusted to the unlocked configuration to enable adjustment of the configuration of the valve package 172 (e.g., during installation or adjustment of the valve package 172 within the HVAC system 150), and the fitting assemblies 186, 192 may be adjusted to the locked configuration to block adjustment of the configuration of the valve package 172 (e.g., after installation or adjustment of the valve package 172 within the HVAC system 150 has been completed). Furthermore, although the present disclosure primarily discusses the use of rotational fittings 220, 222, 226, 228 to adjust the fitting assemblies 186, 192, any suitable adjustable fitting may be used to adjust the fitting assemblies 186, 192, such as to adjust the orientation or spatial configurations between the conduit segments 182, 184, 188, 190 and the intermediate conduit segments 224, 230 in any manner (e.g., translation, bending).

It should be noted that the valve package 172 may include any other or additional components configured to control fluid flow through the conduit assemblies 174, 176. For example, the valve package 172 may include an additional valve 244 (e.g., a flow control valve) configured to regulate a flow rate of fluid through the first conduit assembly 174 and/or the second conduit assembly 176. The valve package 172 may also include a different arrangements of conduit segments, rotational fittings, and/or other components in additional or alternative embodiments.

Figure 7:
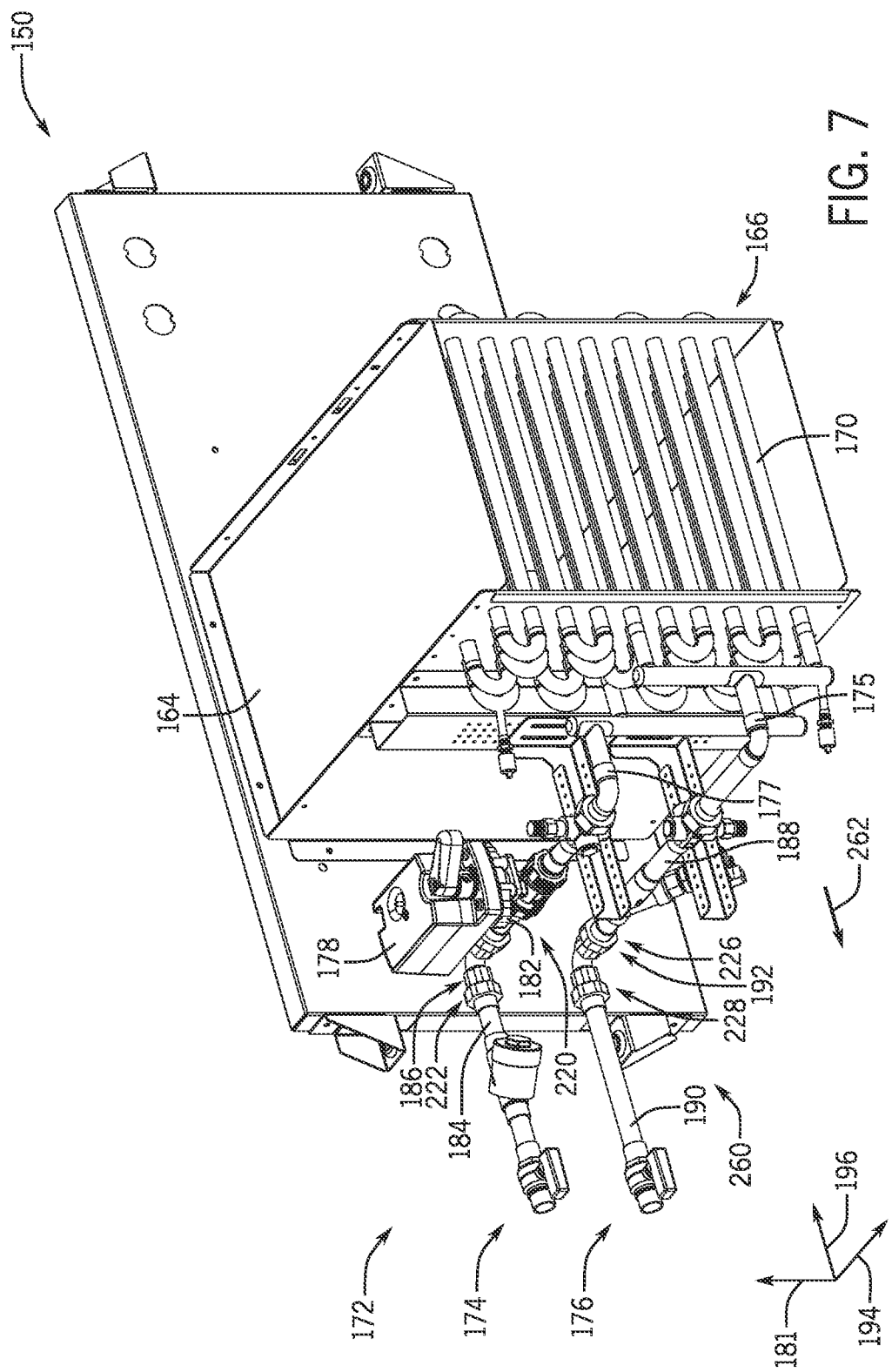
FIG. 7 is a perspective view of a portion of an embodiment of an HVAC system including a valve package, in accordance with an aspect of the present disclosure.

FIG. 7 is a perspective view of a portion of an embodiment of the HVAC system 150. In the illustrated embodiment, the valve package 172 is in a second configuration 260 (e.g., a second installed configuration, a right hand configuration, a second spatial configuration, a second spatial arrangement). In the second configuration 260, the second conduit segment 184 and the fourth conduit segment 190 extend from the first conduit segment 182 and the third conduit segment 188, respectively, along a second direction 262 away from the outlet duct 164 (e.g., toward the working fluid source). In some embodiments, the second direction 262 associated with the second configuration 260 may be opposite the first direction 198 associated with the first configuration 200.

By way of example, the HVAC system 150 illustrated in FIG. 7 may be installed in a different orientation than that of the HVAC system 150 illustrated in FIG. 5. For instance, the orientation of the HVAC system 150 (e.g., including the outlet duct 164) illustrated in FIG. 7 may be inverted relative to the orientation of the HVAC system 150 illustrated in FIG. 5. In some embodiments, the first configuration 200 or the second configuration 260 may be selected based on a particularly installation or application of the HVAC system 150. For example, the first configuration 200 or the second configuration 260 may be selected based on an installed location, position, and/or orientation of the HVAC system 150 and a location of the working fluid source relative to the HVAC system 150 (e.g., a location of external conduits configured to deliver and collect working fluid from the HVAC system 150).

In the second configuration 260, the first conduit assembly 174 may also be positioned above the second conduit assembly 176 with respect to the vertical axis 181 to block condensate from being directed from the second conduit assembly 176 to the actuator 178 of the first conduit assembly 174. For example, the first conduit assembly 174 may be coupled to the inlet port 177 of the heat exchange coils 170, and the second conduit assembly 176 may be coupled to the outlet port 175 of the heat exchange coils 170 in the second configuration 260. Additionally, the fitting assemblies 186, 192 may be adjusted to the unlocked configuration to enable relative rotation between the second conduit segment 184 and the first conduit segment 182 and relative rotation between the fourth conduit segment 190 and the third conduit segment 188 to orient the second conduit segment 184 and the fourth conduit segment 190 to extend in the second direction 262 (e.g., instead of in the first direction 198). Indeed, the fitting assemblies 186, 192 may enable the valve package 172 to transition between the first configuration 200 and the second configuration 260 without disassembling the valve package 172, using other components, or performing other additional changes to the components implemented in the valve package 172.

Figure 8:
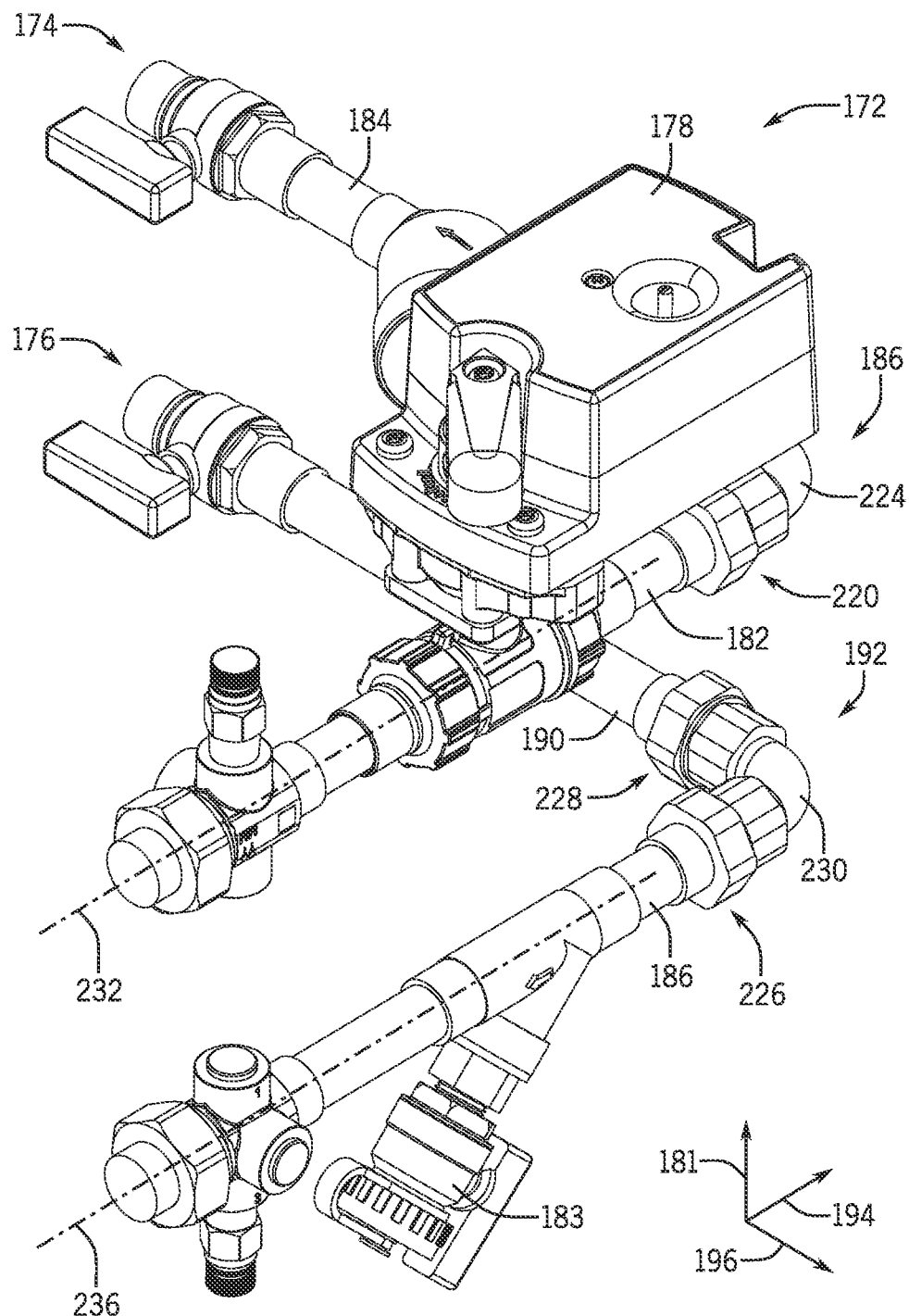
FIG. 8 is a perspective view of an embodiment of a valve package that may be incorporated in an HVAC system, in accordance with an aspect of the present disclosure.

FIG. 8 is a perspective view of an embodiment of the valve package 172 in the second configuration 260. In certain embodiments, the valve package 172 may be transitioned from the first configuration 200 to the second configuration 260 by rotating the second conduit segment 184 relative to the first conduit segment 182 about the first axis 232 via the first rotational fitting 220 and rotating the fourth conduit segment 190 relative to the third conduit segment 188 about the third axis 236 via the third rotational fitting 226. As an example, a user (e.g., a technician, an operator, a customer) associated with the HVAC system 150 may manually adjust the configuration of the valve package 172 via the fitting assemblies 186, 192 and install the valve package 172 after the desirable configuration of the valve package 172 has been set.

Indeed, the fitting assemblies 186, 192 may enable the same embodiment of the valve package 172 to be installed in the first configuration 200, the second configuration 260, an intermediate configuration, or any other suitable configuration within the HVAC system 150. For instance, the valve package 172 may include the same components in each of the configurations. In an example, the fitting assemblies 186, 192 may facilitate manufacture and/or installation of the valve package 172 with multiple embodiments of the HVAC system 150. Indeed, different embodiments of the HVAC system 150 may include the same embodiment of the valve package 172, such as valve packages 172 that include the same embodiment of components (e.g., conduit segments, fitting assemblies). Thus, rather than manufacturing and installing a unique or specific valve package (e.g., a first valve package having conduit segments that extend in the first direction 198, a second valve package having conduit segments that extend in the second direction 262) for each HVAC system 150, the illustrated embodiment of the valve package 172 may be reproduced and incorporated for each of the HVAC systems 150.

In another example, the fitting assemblies 186, 192 may also facilitate adjusting the orientation of an already manufactured and/or installed HVAC system 150 (e.g., to adjust the outlet duct 164 between the orientation illustrated in FIG. 5 and the orientation illustrated in FIG. 7). By way of example, the valve package 172 may be decoupled from the heat exchange coils 170, the configuration of the valve package 172 may be adjusted, and the adjusted valve package 172 may then be re-coupled to the HVAC system 150 without otherwise changing the components included in the valve package 172. In an example circumstance, the valve package 172 may initially be installed in a particular configuration, such as the first configuration 200, into the HVAC system 150 (e.g., at a manufacturer site) to enable installation of the HVAC system 150 in a particular orientation (e.g., the orientation illustrated in FIG. 5), and the HVAC system 150 may be shipped with the installed valve package 172 to an installation location. However, it may be desirable to install the HVAC system 150 in a different orientation (e.g., the orientation illustrated in FIG. 7) at the installation location. To this end, the configuration of the valve package 172 may be adjusted, such as to the second configuration 260. Indeed, the configuration of the valve package 172 may be readily adjustable (e.g., based on particular constraints of the installation location), such as manually by a user at the installation location, without use of specialized tools, additional components, alternative components, and so forth. In this manner, the valve package 172 may facilitate ease of manufacture, transportation, installation, and adjustment of the HVAC system 150.

Figure 9:
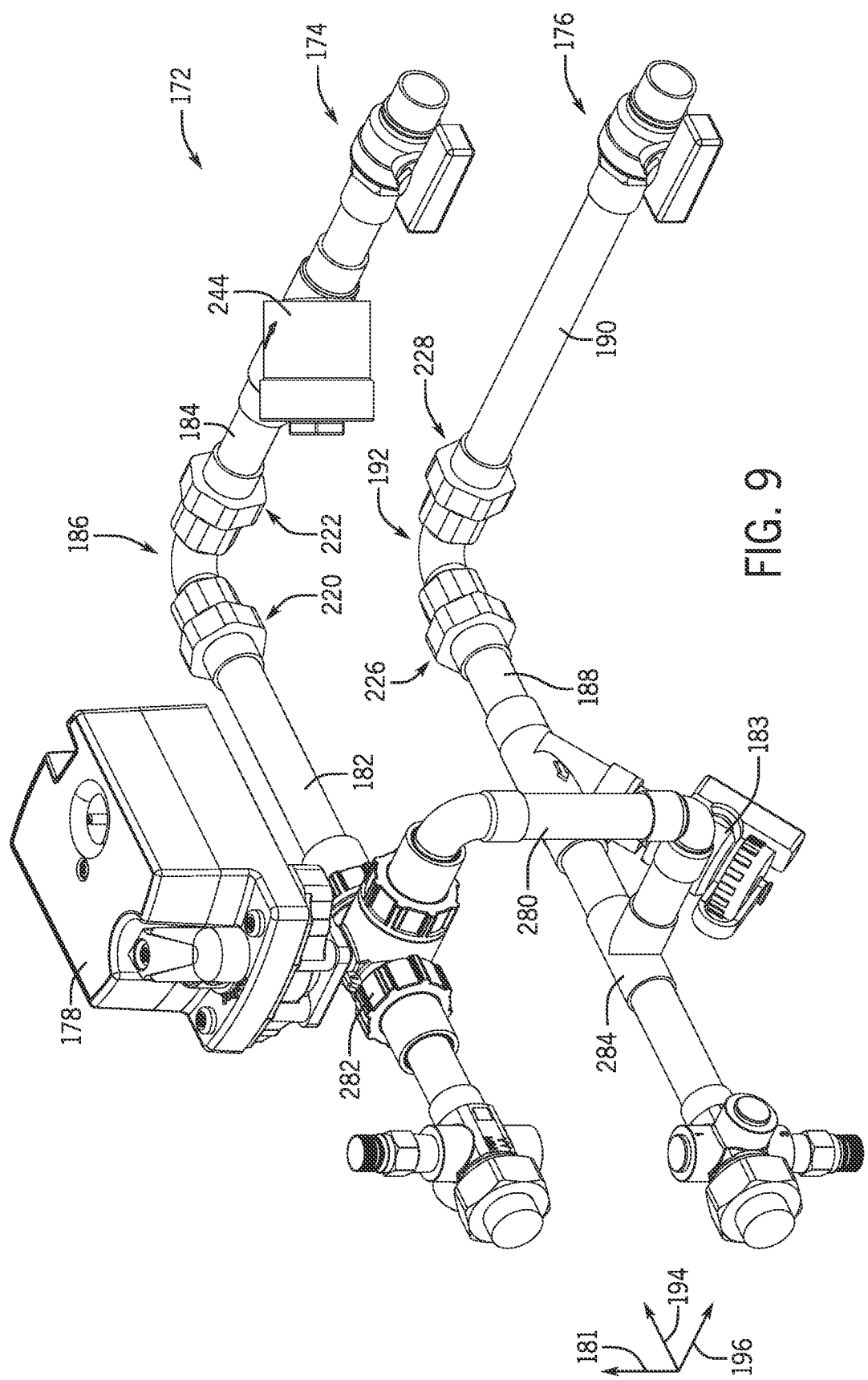
FIG. 9 is a perspective view of an embodiment of a valve package that may be incorporated in an HVAC system, in accordance with an aspect of the present disclosure.

FIG. 9 is a perspective view of an embodiment of the valve package 172. The illustrated valve package 172 includes the first conduit assembly 174 having the first conduit segment 182 and the second conduit segment 184 coupled to one another via the first fitting assembly 186, as well as the second conduit assembly 176 having the third conduit segment 188 and the fourth conduit segment 190 coupled to one another via the second fitting assembly 192. The illustrated valve package 172 also includes a fifth conduit segment 280 fluidly coupling the first conduit segment 182 and the third conduit segment 188 to one another. For example, the first conduit assembly 174 may include a three-way valve 282 fluidly coupled to the first conduit segment 182, and the third conduit segment 188 may include a three-way junction 284. The fifth conduit segment 280 may be fluidly coupled to the three-way valve 282 and the three-way junction 284.

In some embodiments, the fifth conduit segment 280 may direct a portion of the working fluid discharged from the second heat exchanger 166 (e.g., via the heat exchange coils 170) toward the inlet port 177 of the second heat exchanger 166 (e.g., instead of toward the working fluid source). For example, in embodiments in which the first conduit assembly 174 is fluidly coupled to the outlet port 175 of the second heat exchanger 166 and the second conduit assembly 176 is fluidly coupled to the inlet port 177 of the second heat exchanger 166, the fifth conduit segment 280 may direct the working fluid from the first conduit segment 182 to the third conduit segment 188 (e.g., to mix with the working fluid directed from the working fluid source through the second conduit assembly 176). In embodiments in which the first conduit assembly 174 is fluidly coupled to the inlet port 177 of the second heat exchanger 166 and the second conduit assembly 176 is fluidly coupled to the outlet port 175 of the second heat exchanger 166, the fifth conduit segment 280 may direct the working fluid from the third conduit segment 188 to the first conduit segment 182 (e.g., to mix with the working fluid directed from the working fluid source through the first conduit assembly 174). As an example, the fifth conduit segment 280 may increase a flow rate of the working fluid directed into the second heat exchanger 166. As another example, the fifth conduit segment 280 may improve temperature control of the working fluid directed into the second heat exchanger 166. For instance, the three-way valve may control mixing between the working fluid (e.g., of a first temperature) received from the working fluid source and working fluid (e.g., of a second temperature) discharged from the second heat exchanger 166 to achieve a combined working fluid having a target temperature.

In additional or alternative embodiments, the fifth conduit segment 280 may direct a portion of the working fluid to bypass the inlet port 177 of the second heat exchanger 166 and bypass flow through the heat exchange coils 170. Thus, in embodiments in which the first conduit assembly 174 is fluidly coupled to the outlet port 175 of the second heat exchanger 166 and the second conduit assembly 176 is fluidly coupled to the inlet port 177 of the second heat exchanger 166, the fifth conduit segment 280 may direct the working fluid from the third conduit segment 188 to the first conduit segment 182 (e.g., to mix with the working fluid discharged from the second heat exchanger 166 through the first conduit assembly 174). In embodiments in which the first conduit assembly 174 is fluidly coupled to the inlet port 177 of the second heat exchanger 166 and the second conduit assembly 176 is fluidly coupled to the outlet port 175 of the second heat exchanger 166, the fifth conduit segment 280 may direct the working fluid from the first conduit segment 182 to the third conduit segment 188 (e.g., to mix with the working fluid discharged from the second heat exchanger 166 through the second conduit assembly 176). By way of example, the fifth conduit segment 280 may reduce a flow rate of the working fluid directed into the second heat exchanger 166.

The actuator 178 may control the three-way valve 282 in some embodiments. For instance, in addition to controlling an opening of the three-way valve 282 to control a flow rate of the working fluid flowing through the first conduit segment 182, the actuator 178 may control an opening of the three-way valve 282 to control a flow rate of the working fluid flowing through the fifth conduit segment 280. As an example, the actuator 178 may control the three-way valve 282 to achieve a desirable temperature of the working fluid directed into the second heat exchanger 166 and/or to achieve a desirable flow rate of the working fluid directed into the second heat exchanger 166. By way of example, the control system 202 may be configured to operate the actuator 178 based on sensor data received from the sensor 208 to control the three-way valve 282 and adjust flow of the working fluid directed through the valve package 172.

FIG. 10 is a perspective view of an embodiment of the valve package 172. In the illustrated embodiment, the first conduit assembly 174 includes a rotational fitting 300 configured to couple (e.g., directly couple) the first conduit segment 182 and the second conduit segment 184 to one another (e.g., without the first intermediate conduit segment 224), and the second conduit assembly 176 includes a rotational fitting 302 configured to couple (e.g., directly couple) the third conduit segment 188 and the fourth conduit segment 190 to one another (e.g., without the second intermediate conduit segment 230). Thus, the first conduit assembly 174 may include a single rotational fitting 300, rather than the rotational fittings 220, 222, configured to couple to each of the conduit segments 182, 184. Moreover, the second conduit assembly 176 may include a single rotational fitting 302, rather than the rotational fittings 226, 228, configured to couple to each of the conduit segments 188, 190. As such, the first conduit segment 182 and the second conduit segment 184 may be aligned with and/or extend coaxial with (e.g., substantially parallel to) one another, and the third conduit segment 188 and the fourth conduit segment 190 may be aligned with and/or extend coaxial with (e.g., substantially parallel to) one another.

The rotational fitting 300 may enable the first conduit segment 182 and the second conduit segment 184 to rotate relative to one another, such as to enable the second conduit segment 184 to rotate about the first axis 232. The rotational fitting 302 may enable the third conduit segment 188 and the fourth conduit segment 190 to rotate relative to one another, such as to enable the fourth conduit segment 190 to rotate about the third axis 236. Indeed, the rotational fittings 300, 302 may enable adjustment of the valve package 172 between different configurations, such as to adjust orientation of various components of the valve package 172, without fluidly or physically decoupling components of the valve package 172 and/or using other components. For example, an additional component (e.g., the strainer 183) may be coupled to any of the conduit segments 182, 184, 188, 190, and the rotational fittings 300, 302 may, as an example, adjust an orientation of the additional component relative to another of the conduit segments 182, 184, 188, 190 (e.g., for a particular implementation of the HVAC system 150). Thus, the rotational fittings 300, 302 may facilitate a desirable arrangement of the valve package 172 and the HVAC system 150.

In certain embodiments, a particular configuration or embodiment of the valve package 172 may be selected to minimize or limit a number of bends and/or a length of a flow path through which the working fluid is directed to reduce flow resistance, pressure drop, and/or friction losses associated with flow through the valve package 172. Thus, the valve package 172 may enable the working fluid to flow through the valve package 172 at a desirable efficiency and/or flow rate. Moreover, each configuration or embodiment of the valve package 172 may utilize a similar or common set of components. By way of example, each of the conduit segments 182, 184, 188, 190 may include a common embodiment of a conduit segment, such as a similar or common copper tube length. Thus, the use of unique, additional, and/or alternative embodiments of components may be avoided to manufacture different valve packages 172, thereby limiting an inventory list or quantity and reducing costs associated with manufacture and/or installation of various HVAC systems 150. Further still, each configuration or embodiment of the valve package 172 may include specifications that provide ease of manufacture and/or installation. As an example, the valve package 172 (e.g., the rotational fittings 220, 222, 226, 228, 300, 302) may define standard brazing distances to readily enable performance of brazing techniques (e.g., to couple the valve package 172 together more permanently) and also allow ease for manufacture, modularity, and/or assembly. As another example, the valve package 172 may include similar dimensions (e.g., similar bend angles, similar lengths) as that of existing or conventional valve packages. Thus, existing HVAC systems 150 (e.g., HVAC systems 150 that may utilize an existing or conventional valve package) may be retrofitted with the valve package 172.

The present disclosure may provide one or more technical effects useful for an HVAC system. For example, the HVAC system may include a valve package, which may include a conduit assembly configured to direct a working fluid through a heat exchanger of the HVAC system to enable the heat exchanger to condition air flowing across the heat exchanger. The valve package may also include a fitting assembly configured to fluidly couple the conduits of the conduit assembly. In some embodiments, the fitting assembly may include a rotational fitting configured to enable the conduits to rotate relative to one another while establishing a fluid seal between the conduits. As an example, the rotational fitting may enable the orientation between the conduits to be adjusted without decoupling the conduits, recoupling the conduits, and/or using other components. Thus, the rotational fitting may facilitate adjustment of the conduits and of the valve package between different configurations. Adjustment of the valve package between different configurations may enable a single embodiment of the valve package to be manufactured and incorporated in different HVAC systems. By way of example, the single embodiment of the valve package may be manufactured and adjusted to a desirable configuration for incorporation in a particular HVAC system. Thus, the rotational fitting may facilitate incorporation of the valve package into different HVAC systems. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
   a conduit assembly comprising a first conduit segment, a second conduit segment, and a rotational fitting fluidly coupling the first conduit segment and the second conduit segment to one another, wherein the conduit assembly is configured to fluidly couple to a port of a heat exchanger of the HVAC system, and the rotational fitting is configured to enable the first conduit segment and the second conduit segment to rotate relative to one another between a first orientation and a second orientation and maintain a connection between the first conduit segment and the second conduit segment during relative rotation between the first conduit segment and the second conduit segment, wherein the rotational fitting comprises a first mount configured to attach to the first conduit segment and a second mount configured to attach to the second conduit segment, and the first mount is configured to rotate relative to the second mount.

2. The HVAC system of claim 1, wherein the rotational fitting is configured to enable the first conduit segment to rotate about an axis extending along a length of the second conduit segment.

3. The HVAC system of claim 1, wherein the conduit assembly is a first conduit assembly, the rotational fitting is a first rotational fitting, the connection is a first connection, and the HVAC system comprises a second conduit assembly comprising a third conduit segment, a fourth conduit segment, and a second rotational fitting fluidly coupling the third conduit segment and the fourth conduit segment to one another, wherein the second rotational fitting is configured to enable the third conduit segment and the fourth conduit segment to rotate relative to one another between a third orientation and a fourth orientation and maintain a second connection between the third conduit segment and the fourth conduit segment during relative rotation between the third conduit segment and the fourth conduit segment.

4. The HVAC system of claim 3, comprising a valve disposed along the first conduit assembly and an actuator configured to operate the valve to control a flow rate of fluid directed through the first conduit assembly.

5. The HVAC system of claim 4, wherein the actuator is positioned above the second conduit assembly relative to a vertical axis in an installed configuration of the first conduit assembly and the second conduit assembly.

6. The HVAC system of claim 4, comprising a fifth conduit segment fluidly coupled to the first conduit segment and the third conduit segment, wherein the fifth conduit segment is configured to direct the fluid between the first conduit assembly and the second conduit assembly, and the actuator is configured to operate the valve to control a flow rate of the fluid directed through the fifth conduit segment.

7. A valve package for a terminal unit of a heating, ventilation, and/or air conditioning (HVAC) system, comprising:
a first conduit segment configured to couple to a port of a heat exchanger of the terminal unit;
a second conduit segment fluidly coupled to the first conduit segment;
a fitting assembly configured to fluidly couple the first conduit segment and the second conduit segment to one another, wherein the fitting assembly comprises a rotational fitting configured to enable adjustment of the first conduit segment and the second conduit segment between a first spatial configuration and a second spatial configuration, maintain a securement during the adjustment of the first conduit segment and the second conduit segment, and establish a fluid connection between the first conduit segment and the second conduit segment in each of the first spatial configuration and the second spatial configuration; and
a valve fluidly coupled to the first conduit segment and the second conduit segment and configured to control a flow of working fluid through the valve package, a strainer fluidly coupled to the first conduit segment and the second conduit segment and configured to collect solid particles within the working fluid, or both.

8. The valve package of claim 7, wherein the rotational fitting is configured to maintain a fluid seal during the adjustment of the first conduit segment and the second conduit segment.

9. The valve package of claim 7, wherein the fitting assembly is configured to transition between an unlocked configuration and a locked configuration, the fitting assembly is configured to enable relative rotation between the first conduit segment and the second conduit segment via the rotational fitting in the unlocked configuration, and the fitting assembly is configured to block relative rotation between the first conduit segment and the second conduit segment via the rotational fitting in the locked configuration.

10. The valve package of claim 7, wherein the rotational fitting is a first rotational fitting, the fitting assembly comprises an intermediate conduit segment and a second rotational fitting, the first rotational fitting is configured to secure the first conduit segment and the intermediate conduit segment to one another, and the second rotational fitting is configured to secure the second conduit segment and the intermediate conduit segment to one another.

11. The valve package of claim 10, wherein the intermediate conduit segment comprises a bent or curved geometry.

12. A terminal unit of a heating, ventilation, and/or air conditioning (HVAC) system, comprising:
a housing;
a heat exchanger disposed within the housing and comprising a coil configured to direct a working fluid therethrough and place the working fluid in a heat exchange relationship with an air flow directed through the housing; and
a valve package configured to fluidly couple to the coil of the heat exchanger, wherein the valve package is configured to direct the working fluid therethrough, the valve package comprises a first conduit segment, a second conduit segment, and an adjustable fitting coupling the first conduit segment and the second conduit segment to one another, and the adjustable fitting is configured to enable the first conduit segment and the second conduit segment to transition between a first spatial configuration and a second spatial configuration and establish a fluid seal between the first conduit segment and the second conduit segment in each of the first spatial configuration and the second spatial configuration, wherein the first conduit segment extends along a lateral axis of the terminal unit in a first direction in the first spatial configuration, and the first conduit segment extends along the lateral axis in a second direction in the second spatial configuration.

13. The terminal unit of claim 12, wherein the first conduit segment and the second conduit segment are configured to direct the working fluid out of the coil of the heat exchanger in the first spatial configuration, and the first conduit segment and the second conduit segment are configured to direct the working fluid into the coil of the heat exchanger in the second spatial configuration.

14. The terminal unit of claim 12, wherein the valve package comprises a first conduit assembly comprising the first conduit segment, the second conduit segment, and the adjustable fitting, the valve package comprises a second conduit assembly comprising a third conduit segment, a fourth conduit segment, and an additional adjustable fitting coupling the third conduit segment and the fourth conduit segment to one another, and the first conduit assembly is positioned above the second conduit assembly relative to a vertical axis of the terminal unit in each of the first spatial configuration and the second spatial configuration.

15. The terminal unit of claim 12, comprising a valve disposed along the first conduit segment and an actuator configured to control the valve to adjust a flow rate of the working fluid through the valve package.

16. The terminal unit of claim 12, wherein the valve package is disposed external to the housing in an installed configuration of the valve package with the coil.

17. The terminal unit of claim 12, wherein the first conduit segment and the second conduit segment are oriented crosswise to one another in the first spatial configuration and in the second spatial configuration.

18. A terminal unit of a heating, ventilation, and/or air conditioning (HVAC) system, comprising:
a housing;
a heat exchanger disposed within the housing and comprising a coil configured to direct a working fluid therethrough and place the working fluid in a heat exchange relationship with an air flow directed through the housing; and
a valve package configured to fluidly couple to the coil of the heat exchanger, wherein the valve package is configured to direct the working fluid therethrough, the valve package comprises a first conduit segment, a second conduit segment, and an adjustable fitting coupling the first conduit segment and the second conduit segment to one another, and the adjustable fitting is configured to enable the first conduit segment and the second conduit segment to transition between a first spatial configuration and a second spatial configuration and establish a fluid seal between the first conduit segment and the second conduit segment in each of the first spatial configuration and the second spatial configuration, wherein the first conduit segment and the second conduit segment are configured to direct the working fluid out of the coil of the heat exchanger in the first spatial configuration, and the first conduit segment and the second conduit segment are configured to direct the working fluid into the coil of the heat exchanger in the second spatial configuration.

19. A valve package for a terminal unit of a heating, ventilation, and/or air conditioning (HVAC) system, comprising:
a first conduit segment configured to couple to a port of a heat exchanger of the terminal unit;
a second conduit segment fluidly coupled to the first conduit segment; and
a fitting assembly configured to fluidly couple the first conduit segment and the second conduit segment to one another, wherein the fitting assembly comprises a rotational fitting configured to enable adjustment of the first conduit segment and the second conduit segment between a first spatial configuration and a second spatial configuration, maintain a securement during the adjustment of the first conduit segment and the second conduit segment, and establish a fluid connection between the first conduit segment and the second conduit segment in each of the first spatial configuration and the second spatial configuration, wherein the fitting assembly is configured to transition between an unlocked configuration and a locked configuration, the fitting assembly is configured to enable relative rotation between the first conduit segment and the second conduit segment via the rotational fitting in the unlocked configuration, and the fitting assembly is configured to block relative rotation between the first conduit segment and the second conduit segment via the rotational fitting in the locked configuration.

20. The valve package of claim 19, wherein the fitting assembly comprises a locking mechanism configured to transition the fitting assembly between the locked configuration and the unlocked configuration, the locking mechanism comprising a screw, a rod, a clamp, a latch, or any combination thereof.

* * * * *